United States Patent [19]

Hayashi et al.

[11] Patent Number: 4,805,314

[45] Date of Patent: Feb. 21, 1989

[54] METHOD AND APPARATUS FOR SPATIAL COORDINATE MEASUREMENT

[75] Inventors: Koji Hayashi; Susumu Yoshioka; Noritsugu Ono, all of Utsunomiya, Japan

[73] Assignee: Mitutoyo Corporation, Tokyo, Japan

[21] Appl. No.: 40,521

[22] Filed: Apr. 17, 1987

[51] Int. Cl.$^4$ .............................................. G01B 7/28
[52] U.S. Cl. ........................................ 33/503; 33/1 M
[58] Field of Search ................ 33/503, 504, 505, 543, 33/544, 550, 551, 557, 558, 560, 561, 1 M

[56] References Cited

U.S. PATENT DOCUMENTS

| | | | |
|---|---|---|---|
| 3,509,635 | 5/1970 | Meinke | 33/561 |
| 3,631,603 | 1/1972 | Munro | 33/553 X |
| 4,166,323 | 9/1979 | Maag | 33/551 X |
| 4,167,066 | 9/1979 | Cooper et al. | 33/504 |
| 4,631,834 | 12/1986 | Hayashi et al. | 33/503 |

FOREIGN PATENT DOCUMENTS

| | | |
|---|---|---|
| 2037436 | 7/1980 | United Kingdom . |
| 1597842 | 9/1981 | United Kingdom . |
| 2167559 | 5/1986 | United Kingdom . |

Primary Examiner—Harry N. Haroian
Attorney, Agent, or Firm—Flynn, Thiel, Boutell & Tanis

[57] ABSTRACT

A method of and apparatus for effecting spatial coordinate measurement of the contour or the like of an object to be measured in which a plurality of probes are successively used in accordance with the modes of measurement. In one of the probes adapted for measuring the roundness or the like the object, the posture of the probing tip can be changed relative to the main body of the probe by the driving operation of a threaded shaft which extends in the direction perpendicular to the axis of the main body of the probe. A means for driving this threaded shaft is disposed on the side of a probe stocker. The posture of the probing tip is thereby preliminarily changed so as to enable a corresponding predetermined measuring process in which the probe will be used.

9 Claims, 5 Drawing Sheets

METHOD AND APPARATUS FOR SPATIAL COORDINATE MEASUREMENT

BACKGROUND OF THE INVENTION

1. Field of the Invention

This invention relates to a method of and apparatus for effecting spacial coordinate measurement, and more particularly to a coordinate measuring apparatus capable of measuring the roundness or the like of an object to be measured as well as its length and diameter.

2. Description of the Prior Art

One kind of apparatus for effecting coordinate measurement has been known in which an object placed on an object mounting table and a probe supported by a Z-spindle on the main body of the measuring apparatus are spatially moved relative to each other by a moving mechanism; the relative movement between the surface of the object to be measured and the probing tip of the probe is thereby detected; a signal representing the relative movement detected is processed by a data processing unit in a predetermined manner, and the contour, dimensions, etc. of the relevant object are thereby measured. This type of measuring apparatus is being used widely since they can measure the length, diameter, etc. of an object to be measured at high speed with a high degree of accuracy. There are two types of apparatus for use in coordinate measurement of this sort: a manual operation type in which the operator drives the moving mechanism by hand so that the probing tip of the probe is applied to or brought into contact with each measurement point on the object; and an automatic drive type in which the moving technique is driven by a drive source such as a motor under the control of a program.

However, since such a coordinate measurement measuring apparatus, including the manual and automatic operation types, make the probing tip of the probe and the object move in the direction of the composition on three orthogonal axes, that is, X-, Y- and Z-axes determined in accordance with the structure of the apparatus, it is designed to obtain a coordinate for each measurement point by, for instance, bringing the probing tip into contact with the inner peripheral surface of a hole at three points thereof to obtain the coordinate of each point when measuring the inside diameter of the hole, thereafter processing the coordinate data in a predetermined manner.

For this reason, it is impossible for the conventional apparatus for coordinate measurement to effect a measuring operation for identifying the roundness, the cylindricality or the like of an object since such an operation would require items of measurement data to be obtained continuous in the peripheral direction of the hole or shaft while the measuring operation of obtaining the length or diameter is being carried out. To identify the roundness or the like, it is necessary to remove the object from the object mounting table and reset it in a dedicated measuring apparatus, resulting in an extremely low degree of efficiency in the task of measuring. Also the accuracy of measurement is not good, since the conditions of measurement cannot be constantly maintained throughout the measurement process. In the case of the automatic drive type measuring apparatus, the work of removing the object from the mounting table or setting it thereon has to be carried out by the operator and this might affect the specific effectiveness of the automatic drive type.

SUMMARY OF THE INVENTION

The present invention has been made in consideration of the fact that the conventional measuring apparatus for effecting coordinate measurement cannot measure roundness or the like because the probe is attached to the body of the measuring apparatus and is incapable of moving its position relative to the apparatus, and that, on the other hand, it is necessary to fix the probe on the body of the apparatus so that the measurement can be performed.

It is an object of the invention to provide a coordinate measuring apparatus in which the roundness, the cylindricity or the like of an object to be measured can be also measured, thereby increasing the number of measurement items and improving the applicability of the apparatus.

It is another object of the present invention to speedily effect the selection and the operation of mounting and dismounting the probe in accordance with the mode of the measurement and enable the measurement to be continuously effected, thereby improving the efficiency of measurement.

The present invention provides in one of its aspects a coordinate measuring apparatus in which: an object to be measured placed on an object mounting table and a probe supported by a Z-spindle on the body of the apparatus are spatially moved relative to each other by a moving mechanism; the relative movement between the surface of the object to be measured and a probing tip of the probe is detected; and the relative movement thereby detected is processed by a data processing means, thereby measuring the contour and so forth of the object to be measured, the measuring apparatus comprising: a rotary drive means for turning the Z-spindle about a Z-axis line; a posture changing means for changing the posture of the probing tip of the probe for measuring roundness or the like by moving the probing tip in the direction perpendicular to the axis of the probe; a displacement detector for detecting and outputting a displacement of the probing tip after converting the same into an analog signal, the displacement of the probing tip varying in accordance with the contour of the surface of a round shaft portion of the object when the probing tip is brought into contact with the round shaft portion; an angle detector adapted for detecting the relationship between the rotational positions of the probing tip of the roundness measuring probe and the surface of the round shaft portion to be measured, the probing tip being attached to the Z-spindle which is turned by the rotary drive means.

The roundness of the object is measured on the basis of output signals from the displacement detector and the angle detector by turning the probe for measuring roundness or the like while the probing tip is in contact with the round shaft portion in the diametral direction thereof. It is also possible to measure the cylindricality by conducting the movement of the probe in the direction of Z-axis by moving the Z-axis structure. The probing tip can be moved in the diametral direction of the roundness measuring probe by the effect of the posture changing means so that it can be adapted to measure the round shaft portion when the same has a different diameter.

To effect, for instance, an ordinary measuring operation by using a touch-signal probe with respect to the contour or the like of the object to be measured, the angle of rotation of the Z-axis structure disposed on the main body of the apparatus and the probe attached to the Z-spindle is determined by the angular position determining means, thereby fixing the probe. When roundness or the like is measured by using the roundness measuring probe, this angular position determining means is released, and the roundness measuring probe is turned by the rotary drive means together with the Z-spindle.

The present invention provides in another of its aspects a method in which, while the object placed on the object mounting table is being measured by using one of the probes in a predetermined manner, the posture of the probing tip of another one of the probes to be used in the next measurement process is changed relative to the main body of this probe.

DETAILED DESCRIPTION OF THE PREFERRED EMBODIMENT

Figure 1:
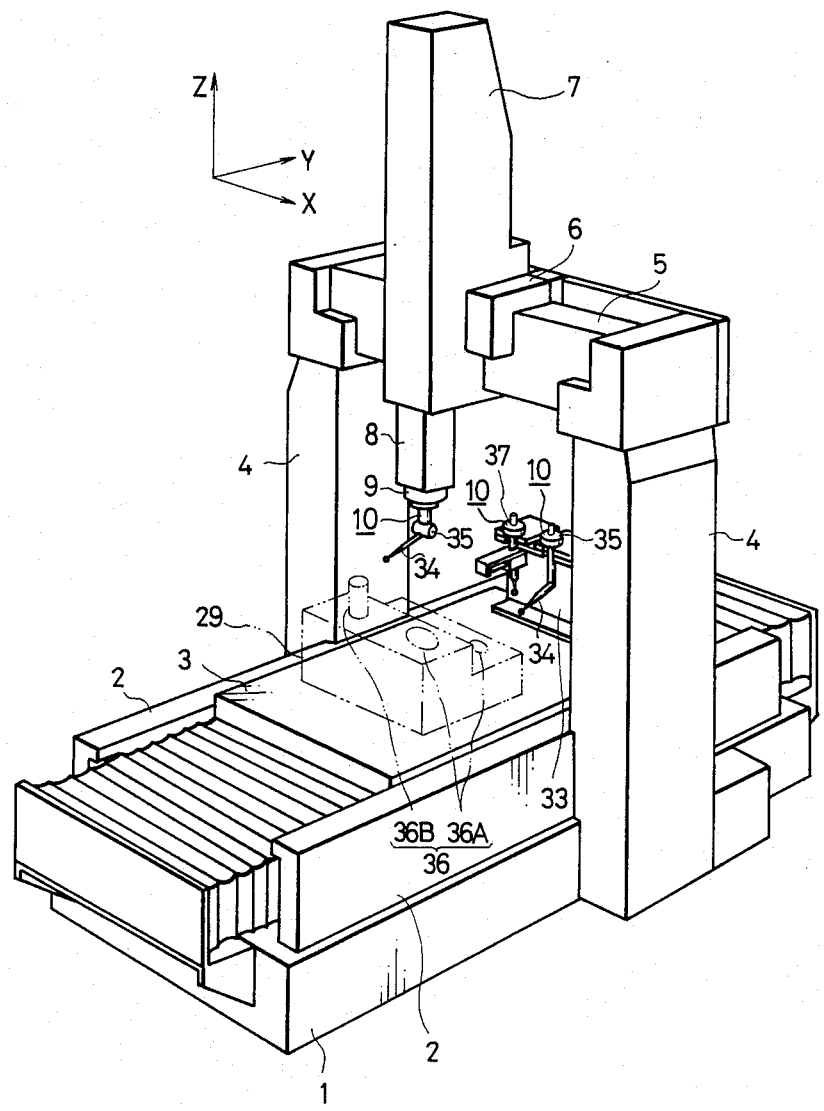
FIG. 1 is a perspective view of the entire part of a coordinate measuring apparatus in accordance with the present invention.

FIG. 1 shows the entire part of a coordinate measuring apparatus in accordance with the present invention. An object mounting table 3 is disposed above a base 1 between the left and right side covers 2 such as to be movable in the direction of Y-axis. A transverse beam member 5 is attached to the top ends of pillars 4 which are fixed to left and right sides of the base 1, and a slider 6 is mounted on the beam member 5 such as to be movable in the direction of X-axis. A Z-axis structure 8 is disposed such as to be movable in the vertical direction or the direction of Z-axis in a cover 7 which is integral with the slider 6. A Z-spindle 9 is incorporated in the Z-axis structure 8, and a probe 10 is attached to the top of the Z-spindle which projects from the lower end of the Z-structure 8. The main body of the measuring apparatus is constituted by the base 1, the object mounting table 3, the pillars 4, the transverse beam member 5, the slider 6, and the cover 7 and so forth. The probe 10 is mounted on the main body of the measuring apparatus through the medium of the Z-spindle 9 and the Z-structure 8.

Figure 2:
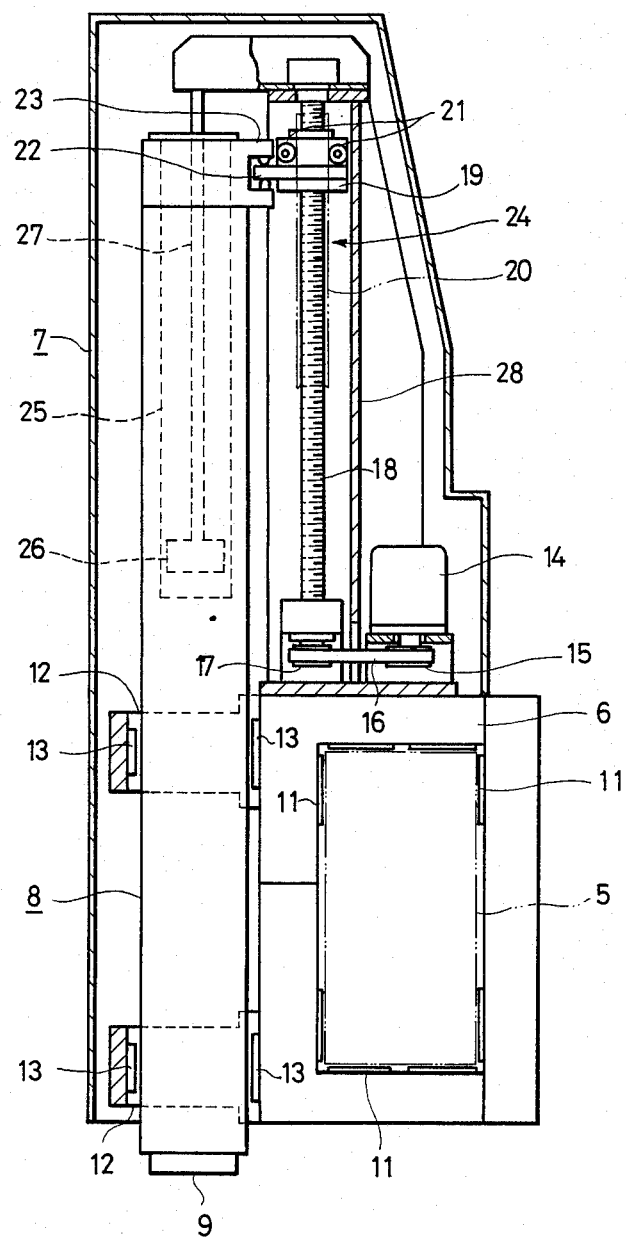
FIG. 2 is a cross-sectional view of a Z-axis structure in the measuring apparatus shown in FIG. 1.

FIG. 2 shows a driving unit of the Z-axis structure 8 in a cross-sectional view of the cover 7. The slider 6 which takes the form of a quadrangular frame encircling the transverse beam member 5 is movable in the direction of the X-axis relative to the transverse beam member 5 by virtue of the effect of pneumatic bearing means 11. The Z-axis structure 8 in the form of a quadrangular prism is movable in the direction of Z-axis, namely, the axial direction of the Z-axis structure 8 by virtue of the effect of pneumatic bearing means 13 of a bracket 12 connected to the slider 6 but it is incapable of rotating about a Z-axis line. A motor 14 is mounted on the slider 6, and a threaded shaft 18 with a vertically extending axis is connected to the drive shaft of the motor 14 by a pulley 15, timing belt 16 and a pulley 7. Rotatable rollers 21 which opposingly pinch a guide rail 20 mounted on the cover 7 are attached to a nut member 19 which is screwed onto the threaded shaft 18. When the threaded shaft 18 is rotated by the motor 14, the nut member 19 is vertically moved by the transporting operation of the threaded shaft 18 while being inhibited from being rotated by the rollers 21. A projection member 22 extending toward the Z-axis structure 8 is integrally provided on the nut member 19 and is pinched in the vertical direction between coupling members 23 which are connected to the top of the Z-axis structure 8, thereby connecting the nut member 19 to the Z-axis structure 8 so that the Z-axis structure 8 moves in the direction of Z-axis when the nut member 19 moves vertically.

The motor 14, the threaded shaft 18, the nut member 19 and other members constitute a driving unit 24 for moving the Z-axis structure 8 in the direction of Z-axis. An air balance cylinder 25 is incorporated in the Z-axis structure 8. A piston rod 27 of a piston 26, which is slidably disposed in the cylinder 25, is connected to the upper end of a bracket 28 fixed on the slider 6, and the upper part of the cylinder 25 above the piston 26 is supplied with air, so that the Z-axis structure 8 moves vertically while the weight thereof is being balanced and supported by the pressure of the air.

The movement of the object mounting table 3 relative to the base 1 in the direction of the Y-axis and the movement of the slider 6 relative to the transverse beam member 5 in the direction of X-axis are effected by corresponding driving units constituted by motors, screws, etc., in a manner similar to the case of the driving unit 24 of the Z-axis structure 8. These driving units in relation to X-, Y- and Z-axes are controlled by a computer on the basis of a preset program, thereby spatially moving the probe 10 in accordance with the measurement procedure relative to an object 29 to be measured which is placed and fixed on the object mounting table 3.

When the object mounting table 3 is moved relative to the base 1, a relative movement in the direction of Y-axis occurs between the probe 10 and the object 29; when the slider 6 is moved relative to the transverse beam member 5, the probe 10 is moved in the direction of X-axis relative to the object 29; and when the Z-axis structure 8 is moved relative to the slider 6, a relative movement in the direction of the Z-axis occurs between the probe 10 and the object 29. The driving units in relation to X-, Y- and Z-axes, the mounting table 3, the transverse beam member 5 and so forth constitute a moving mechanism which spatially moves the probe 10 relative to the object 29 while each driving unit is being controlled by the computer on the basis of a given program. Thus the coordinate measuring apparatus in accordance with the embodiment of the present invention is designed to be of the automatic drive type. Y-axis relative movement of the probe 10 relative to the object 29 is detected by a Y-axis movement detector 30 (see FIG. 5), and X-axis relative movement and Z-axis relative movement of the probe relative to the object are respectively detected by an X-axis relative movement detector 31 dispsoed between the transverse beams member 5 and the slider 6, and a Z-axis relative movement detector 32 disposed between the slider 6 and the Z-axis structure 8.

As shown in FIG. 1, a probe stocker 33 is disposed at the rear end of the object mounting table 3, and a plurality of probes 10 are successively replaced and attached to the Z-spindle 9 in accordance with the contour or other factors of the surface of the object 29 to be measured. Touch-signal probes 35 which output a touch signal when a probing tip 34 contacts the surface of the object 29 to be measured and another type of probe 37 for measuring the roundness, cylindricality and the like of round shaft portions 36, such as a hole 36A and a circular cylinder 36B formed on the object 29 are included in the probes 10. Touch-signal probes 35 involve a type in which the probing tip 34 has a different length or a type in which the probing tip 34 is capable of being bent and turned relative to the axis of the main body of the probe and capable of being maintained in a bent posture. In the state shown in FIG. 1, one of the touch-signal probes 35 having the latter type of probing tip 34 has been attached to the Z-spindle 9.

Figure 4:
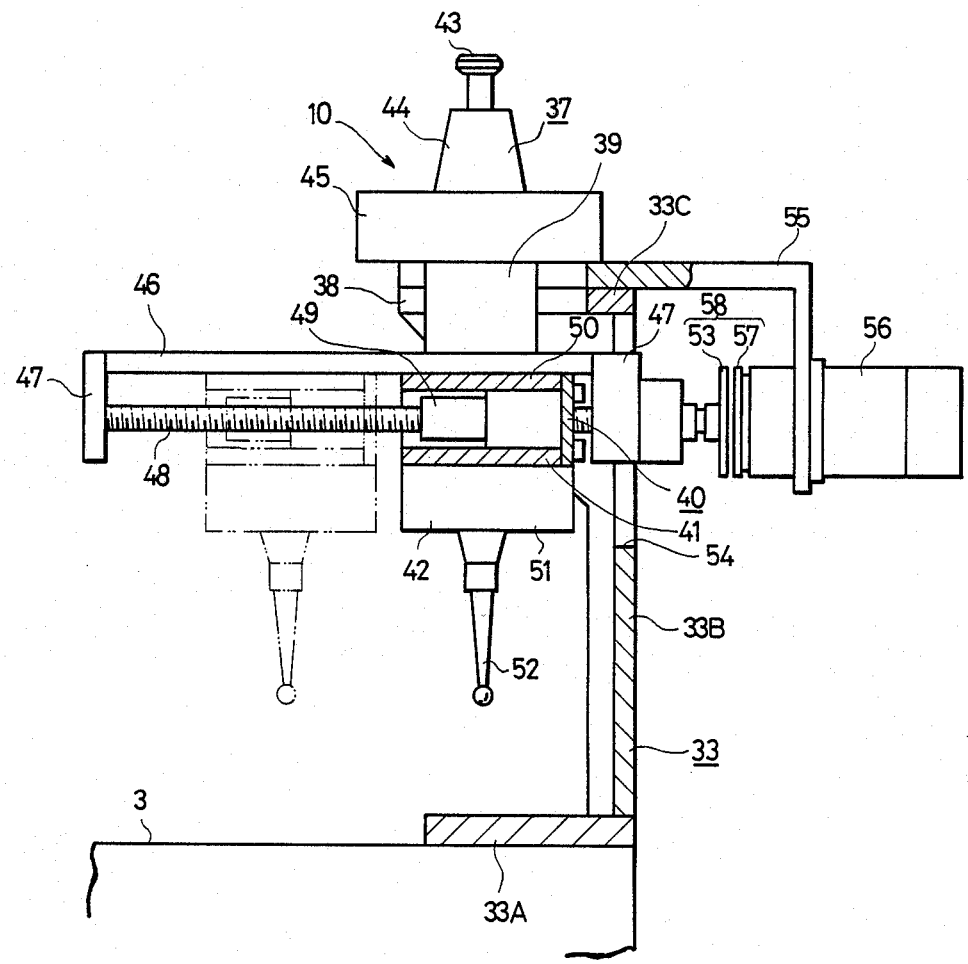
FIG. 4 is a side view partly in section in which the construction of a probe for measuring roundness or the like is illustrated.

As shown in FIG. 4, the probe stocker 33 having a generally U-shaped profile is constituted by a bottom 33A attached to the upper surface of the object mounting table 3, a leg portion 33B standing on the bottom portion 33A, and a top portion 33C disposed horizontally and fixed to the top end of the leg portion 33B. A plurality of recesses 38 which have generally U-shaped forms in plan and which are opened toward the front are formed in the top portion 33C. Each probe 10 is fitted into a predetermined one of these recesses 38 so that it is accommodated in the probe stocker 33 in a given position. Each of the above-mentioned roundness measuring probe 37 is provided with a main body 39, a posture changing mechanism 41 which constitutes a posture changing means 40, and a detecting unit 42.

A pull stud 43 is provided on the top of the main body 39 of the probe, and a tapered projection 44 and a flange 45 are integrally formed under the pull stud 43. The construction of the main body 39 is the same as that of the above-mentioned touch-signal probe 35. A threaded shaft 48 which is rotatably supported by bearings 47 disposed at the opposite ends of a support member 46 is disposed below the main body 39 of the probe. A nut member 49 is screwed onto the threaded shaft 48 which is of a ball screw type with the axis thereof extending in the horizontal direction. The nut member 49 is held in a retaining member 50 which is slidably in contact with the lower surface of the support member 46 and is thereby inhibited from being rotated. When the threaded shaft 48 rotates, the retaining member 50 moves in the horizontal direction by the effect of the transporting operation of the threaded shaft 48. The threaded shaft 48, the nut member 49 and other members constitute the above-mentioned posture changing mechanism 41.

The detecting unit 42 which is constituted by a displacement detector 51, and a probing tip 52 extending downward from the displacement detector 51 is attached to the lower surface of the retaining member 50. When the retaining member 50 is moved in the horizontal direction by the rotation of the threaded shaft 48, the probing tip 52 is forcibly moved linearly in the diametral direction of the probe 37, thereby changing the posture of the probing tip 52. The upper end of the probing tip 52 is swingably connected to the displacement detector 51, and therefore the probing tip 52 is tiltable relative to the direction of the Z-axis, so that the probing tip 52 can be displaced in the direction perpendicular to a Z-axis line, that is, in the horizontal direction. The displacement detector 51 is constituted by a differential transformer or the like adapted for detecting this horizontal movement of the probing tip 52 and outputs an electric analog signal in accordance with displacement of the probing tip 52.

One end of the threaded shaft 48 projects through the bearing 47, and a first clutch member 53 is attached to this projecting end. When the roundness measuring probe 37 is placed on and accommodated in the probe stocker 33, this first clutch member passes through a hole 54 formed in the leg portion 33b of the probe stocker 33 and projects toward the rear side of the probe stocker 33. A motor 56 is mounted on the probe stocker 33 by the bracket 55, and a second clutch member 57 is attached to the output shaft of the motor 56 positioned at the rear of the probe stocker 33. The first and second clutch members 53 and 57 constitute an electromagnetic clutch 58. The threaded shaft 48 rotates when this electromagnetic clutch 58 is connected and the motor 56 is rotated.

Figure 3:
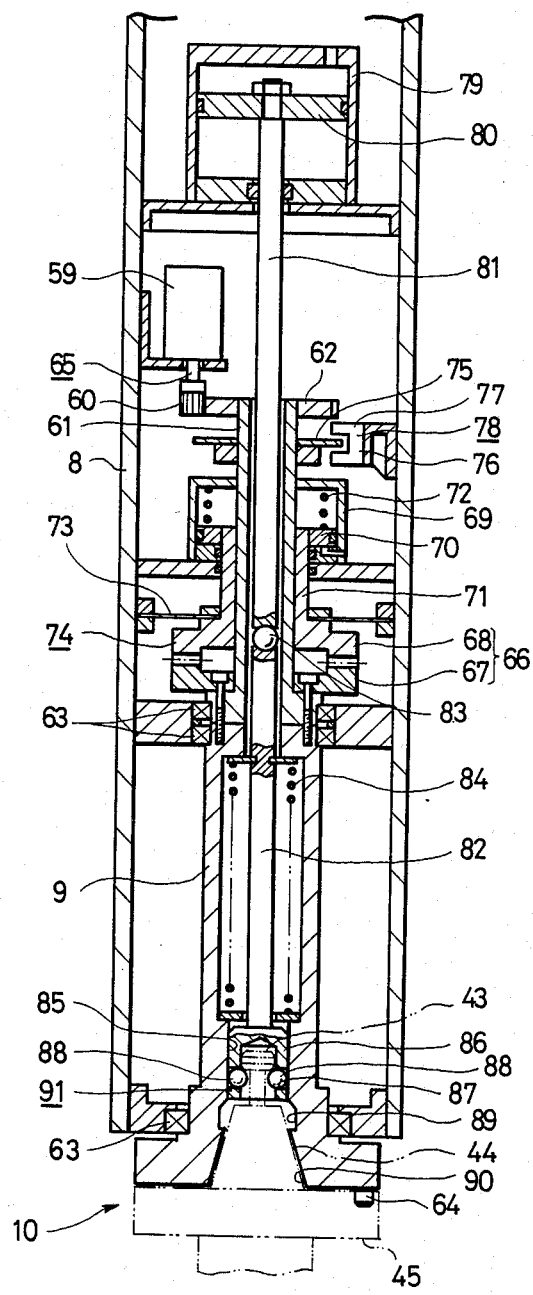
FIG. 3 is a cross-sectional view in which the internal construction of the Z-axis structure is illustrated.

Thus the motor 56 constitutes a driving mechanism which drives the posture changing mechanism 41, and the posture changing mechanism and the motor 56 constitute the posture changing means 40 which linearly moves the position of the probing tip 52 in the diametral direction of the probe 37. FIG. 3 shows the internal construction of the Z-axis structure 8. A motor 59 is disposed in an inner space of the Z-axis structure 8 such as to face downward. A small gear 60 which is attached to the output shaft of the motor 59 is engaged with a large speed reduction gear 63 which is attached to the upper end of a connecting shaft 61. The above-mentioned Z-spindle 9 is integrally connected to the lower end of the connecting shaft 61, and the Z-spindle 9 is supported by a bearing 63 such as to be rotatable about a Z-axis line. A pin 64 is disposed on the top of the spindle 9 which is exposed at the lower end of the Z-axis structure 8. The pin 64 is engaged with a hole formed in the flange 45 of the probe 10. The probe 10 is thereby positioned relative to the Z-spindle 9 in the peripheral direction thereof when the probe 10 is supported on the Z-spindle 9. The motor 69, the small gear 60, the large gear 62, the connecting shaft 61 and other members constitute a rotary drive means 65 for rotating the Z-spindle 9 and the probe 10.

A first gear 67 which is provided as one of a pair of engaging members in a coupling 66 is attached to the connecting shaft 61, and a second gear 68 provided as the other one of the engaging members is disposed such as to face the first gear 67 in the vertical direction. The second gear 68 is integral with a piston rod 71 of a piston 70 which is vertically movable in a cylinder 69 and which is constantly urged downward by a spring 72, so that the first and second gears 67 and 68 engage with each other. A diaphragm 73 which is connected to the Z-axis structure 8 is attached to the second gear 68. Since the diaphragm 73 can be displaced in the vertical direction, the second gear 68 is vertically movable, but the rotation of the second gear 68 is inhibited by the diaphragm 73. The first and second gears 67 and 68 have a plurality of teeth formed in the peripheral direction. Therefore, when the first and second gears are engaged with each other, the rotation of the Z-spindle 9 and the probe 10 is inhibited, thereby determining the angular position of the Z-spindle 9 or the probe 10. This position can be determined at a desired point in the direction of rotation. These first and second gears 67 and 68 and the cylinder 69 and other members constitute an angular position determining means 74 whereby the position of the Z-spindle 9 or the probe 10 in the direction of rotation about a Z-axis line relative to the Z-axis structure 8 is fixed to a given angular position.

A rotary disk 75 is attached to the connecting shaft 61, and a detector 76 which, together with the rotary disk 75, constitutes a rotary encoder 77 is attached to the inner wall of the Z-axis structure 8. The rotary encoder 77 is connected to the above-described rotary drive means 65 by the connecting shaft 61 and is provided as an angle detector 78 for detecting the angle of rotation of the Z-spindle 9 or the probe 10 when these members are rotated by the rotary drive means 65. The angle detector 78 may be constituted by a pulse generator instead of the rotary encoder 77.

A cylinder 79 is incorporated in the Z-axis structure 8, a piston rod 81 of the piston 80 disposed in the cylinder 79 extending downward is inserted into the hollow connecting shaft 61. The lower end of the piston rod 81 is coupled by a ball 83 with the upper end of a driving rod 82 which is inserted into the hollow Z-spindle 9, and the driving rod 82 is constantly urged upward by a spring 84. Therefore the piston rod 81 and the driving rod 82 integrally move in the axial direction while the driving rod 82 is rotatable relative to the piston rod 81. The lower end of the driving rod 82 has a ball holder 86 which is vertically movable in a smaller bore 85 formed in the Z-spindle 9 at the center thereof, and a plurality of balls 88 which are fitted into apertures 87 are disposed in the ball holder 86 such as to be movable in the radial direction. A larger bore 89 is formed in the Z-spindle 9 such as to be continued from the smaller bore 85, and a tapered hole 90 is also formed in the Z-spindle 9 such as to be continued from the larger bore 89 and opened in the lower surface of the Z-spindle 9.

When the piston rod 81 and driving rod 82 are pushed down against the urging force of the spring 84 by supplying air into the cylinder so that the ball holder 86 is moved downward to a position in which the balls 88 face the larger bore 89 and when in this state the pull stud 43 of the probe 10 is inserted into the ball holder 86, the ball 88 is moved outwardly in the radial direction so as to allow the pull stud 43 to be inserted into the internal part of the ball holder 86. Then, when air is discharged from the cylinder 79 so that the driving rod 82 and the piston rod 81 is moved upward by the urging force of the spring 84, the balls 88 travel from the larger bore 89 to the smaller bore 85 and are moved inwardly in the radial direction. The balls 88 are thereby engaged with the shaft portion of the pull stud 43, and the probe 10 is pulled upward together with the ball holder 86 and is fitted into the Z-spindle while being positioned therein by fitting the tapered projection 44 into the tapered hole 90. When the ball holder 86 is again pushed down by supplying air into the cylinder 79 to make the balls 88 face the larger bore 89, the balls 88 are moved outwardly in the radial direction by the effect of the taper of the pull stud 43 and the weight of the probe 10, thereby removing the probe 10 from the Z-spindle 9.

The cylinder 79, the piston rod 81, the driving rod 82, the ball holder 86 and other members constitute a probe mounting and dismounting mechanism 91 for attaching the probe 10 to the Z-spindle 9 and removing the probe 10 therefrom.

The operation of the apparatus thus constituted will be described below.

A measuring operation is carried out with respect to the object 29 which has the circular cylinder portion 36B or the like which needs to be measured with respect to the roundness of inner or outer diametral portions, the cylindricality and so forth. If, in this measuring operation, the touch-signal probe 35 whose probing tip 34 is bent relative to the main body of the probe is first used as shown in FIG. 1, the direction of the probing tip 34 is adjusted to that of the inclination of the surface of the object 29 to be measured. That is, the cylinder 69 of the angular position determining means 74 shown in FIG. 3 is supplied with air, and the second gear 68 is thereby moved upward against the spring 72 to be released from the engagement with the first gear 67, thereby making the Z-spindle freely rotatable. The motor 59 of the rotary drive means 65 is thereafter rotated so as to turn the Z-spindle and the touch-signal probe 35 about the Z-axis line through the medium of the small gear 60, the large gear 62 and the connecting rod 61. When the direction of the probing tip 34 of the probe 35 coincides with a predetermined direction, the rotation of the motor 59 is stopped and then air is discharged from the cylinder 69. The second gear 68 is thereby engaged with the first gear 67 by the force of the spring 72. In this manner, the Z-spindle and the touch-signal probe 35 are positioned and fixed by the angular position determining means 74 at a rotation-angle position displaced at this time, thereby maintaining the probing tip 34 in a fixed direction. The rotation of the motor 59 is controlled by the above-mentioned computer which controls the driving operation of the moving mechanism.

The above-described driving units in relation to X-, Y-and Z-axes operate under the control of the computer based on a program, and the touch-signal probe 35 and the object 29 are spatially moved relative to each other. This relative movement is conducted in each step of measurement in accordance with the measurement procedure based on the program. If necessary, the direction of the probing tip 34 is changed in each step of measurement in the same manner as described above.

Figure 5:
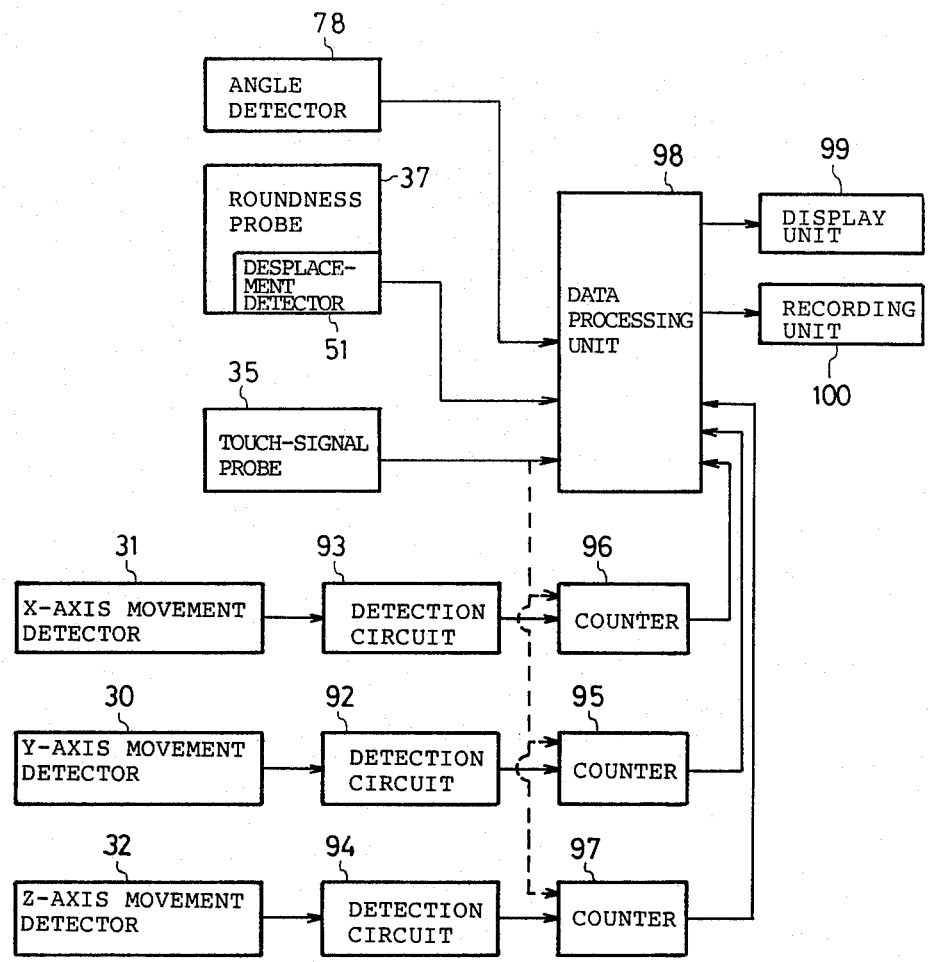
FIG. 5 is a block diagram of the electrical construction of the measuring apparatus shown in FIG. 1.

The extent of relative movement between the probe 35 and the object 29 is detected with respect to X-, Y- and Z-axes by the detectors 30, 31 and 32 shown in FIG. 5. The outputs from the detectors 30, 31 and 32 are processed by the detection circuits 92, 93 and 94 in the manner of waveform shaping, dividing and so forth, thereby outputting pulse numbers in accordance with the extent of relative movement. These pulse numbers are counted by counters 95, 96 and 97, and count value signals thereby obtained are supplied to the data processing unit 98. The touch-signal probe 35 outputs a touch-signal each time the probing tip contacts the surface of the object 29 in each step of measurement. This touch-signal is supplied to the data processing unit 98, and the data processing unit 98 having calculating functions calculates the contour, the length, diameter and so forth in each step of measurement on the basis of the count-value signals supplied from the counters 95, 96 and 97 at the time of the occurrence of the touch signal. The results thereby obtained are displayed by the display unit 99 in digital forms and are recorded by a recording unit 100. If the touch-signal probe 35 has been connected to the counters 95, 96 and 97, the counters 95, 96 and 97 hold pulse numbers counted when a touch signal is output, and the data processing unit 98 calculates the contour and so forth of the object 29 on the basis of the signal values held by the counters.

If the next measuring operation is to measure the roundness or the like of the round shaft portion 36, the preparatory operation with respect to the roundness measuring probe 37, which has been accommodated in the probe stocker 33 and is ready to be used, is previously carried out in the following manner while the preceding measuring operation is being carried out. That is, the electromagnetic clutch 58 shown in FIG. 4 is connected, and the motor 56 which constitutes the posture changing means 40 is rotated, thereby rotating the threaded shaft 48 so that the position of the probing tip 52 is forcibly moved linearly in the diametral direction of the probe 37. The probe 37 is prepared in such a manner that, when the probe 37 is fitted to the Z-spindle 9, the distance between the center axis of the Z-spindle 9 and the probing tip corresponds to the diameter of the round shaft portion 36 which is to be measured with respect to the roundness thereof. The clutch 58 is thereafter disconnected. The rotation of the motor 56 is controlled by the above-described computer.

In this embodiment, the preparatory operation with respect to the roundness measuring probe 37 for use in the operation of measuring the roundness and the like is carried out while the preceding measuring operation is being carried out, thereby minimizing the time of measuring operation. Since the position of the probing tip 52 of the probe 37 can be moved by the posture changing means 40 in the diametral direction relative to the main body 39 of the probe 37, the probe can be commonly applied with respect to any diameter of the round shaft portion 36, thereby reducing the number of probes necessary for the operation of measuring the roundness or the like. Specifically, the posture changing means 40 is constituted by the posture changing mechanism 41 and the motor 56 adapted for driving this mechanism 41, and the motor 56 is not provided on the probe 37 but attached to the probe stocker 33, so that the weight of the probe 37 can be correspondingly reduced and the extent of movement of the probing tip 52 can be increased by increasing the size of the posture changing mechanism 41.

After the measuring operation using the touch-signal probe 35 has been completed, the object mounting table 3 shown in FIG. 1 is moved in the direction of Y-axis so that the probe stocker 33 is positioned right below the Z-axis structure 8. Then the slider 6 is moved in the direction of X-axis, the Z-axis structure 8 is moved downward by the Z-axis driving unit 24, and the cylinder 7 shown in FIG. 2 is supplied with air so as to downwardly move the ball holder 86, so that the probe mounting and dismounting mechanism 91 accommodates the touch-signal probe 35 in the probe stocker 33 by replacing the touch-signal probe 35 from the Z-spindle 9 to the given position in the probe stocker 33. The Z-axis structure 8 is thereafter moved upward, the slider 6 is moved in the direction of X-axis, and the Z-axis structure 8 is positioned right above the roundness measuring probe 37. The Z-axis structure 8 is again moved downward so that the probe 37 is attached to the Z-axis spindle 9 by the probe mounting and dismounting mechanism 91.

Next, the roundness measuring probe 37 is brought close to the round shaft portion 36 of the object 29 by the driving operations of the driving units with respect to the X-, Y- and Z-axes, and the probing tip 52 is brought into contact, in the diametral direction, with the surface of the roundness shaft portion 36 to be measured. The engagement between the first and second gears 67 and 68 is released by supplying air into the cylinder 69 of the angular position determining means 74 shown in FIG. 3, and the motor 59 of the rotary drive means 65 is then rotated, thereby turning the Z-axis spindle 9 and the probe 37 about the Z-axis line. The probing tip 52 is displaced in the diametral direction of the round shaft portion 36 in accordance with the contour of the surface thereof to be measured while moving around the surface of the round shaft portion 36, and the displacement detector 51 of the probe 37 outputs a continuous analog signal in accordance with the displacement of the probing tip 52. This signal is supplied to the data processing unit 98 shown in FIG. 5. During this process, the relationship between the positions of the surface of the round shaft portion 36 and the probing tip in the direction of rotation is constantly detected by the operation of the angle detector 78 which is constituted by the rotary encoder 77 and which is disposed on the connecting shaft 61 which integrally rotates with the Z-spindle 9. A signal which represents the relationship thereby detected is supplied to the data processing unit 98.

The data processing unit 98 caluculates and processes the output signals from the displacement detector 51 and the angle detector 78, thereby identifying the roundness of the round shaft portion 36. The results of this measurement are displayed by the display unit 99 in the digital form and are recorded by the recording unit 100. In this operation of measuring the roundness, it is preferable to precisely align the axis of the Z-spindle 9 which is the center of rotation of the probe 37 with the center of the round shaft portion 36. However, the misalignment thereof may be corrected on the basis of the calculation effected by the data processing unit 98.

To measure the roundness or the cylindricality of the round shaft portion 36 at a plurality of points thereon, the above-described turning movement of the Z-spindle 9 and the probe 37 may be effected by the rotary drive means 65 along with the above-described vertical movement of the Z-axis structure 8 by the Z-axis driving unit 24. The extent of vertical movement of the Z-axis structure 8 which is supplied to the data processing unit 90 for the calculation of the roundness is obtained by the above-described Z-axis movement detector 32. Also the irregularity of the surface of the round shaft portion 36 in the peripheral direction thereof can be measured by turning the probe 37 by the operation of the rotary drive means 65.

When the measuring operation is continued by using a different one of the probes 10 accommodated in the probe stocker 33 after the operation of measuring the roundness or the like has been completed in the above-described manner, the probe may be replaced in accordance with the same procedure as that in the above case.

The operation of replacing the probe and the operation of measuring the roundness or the like by the rotary drive means 65 and other means are automatically conducted under the control of the computer.

As is clear from the above description, it is possible to turn the roundness measuring probe 3 about a Z-axis line for the measurement of roundness, cylindricality or the like by utilizing the rotary drive means 65 which is incorporated in the Z-axis structure 8. Thus roundness or the like can be measured by using only one means provided for a double purpose. The angular position determining means 74 which is disposed in the Z-axis structure 8 for the purpose of determining the rotational position of the Z-spindle and the probe 35 may be released during the operation of measuring roundness, cylindricality or the like and may be used only in the measuring operation using the touch-signal probe 35.

In the above-described coordinate apparatus which represents the embodiment of the present invention, X- and Y-axes are horizontal and Z-axis is vertical, but one of X-and Y-axes may be vertical, the other one of them and Z-axis being horizontal. The invention has been described with respect to the automatic drive type coordinate measurement, but the present invention may be applied to a manual coordinate measuring apparatus in which the operator conducts coordinate relative movement between the probe and the object to be measured. However, if the present invention is applied to an automatic drive type measuring apparatus, the roundness, the cylindricality or the like of the round shaft portion of the object to be measured can be automatically measured as well as the contour, the size and so forth without any need for operation by hand. If the present invention is applied to a type of coordinate measuring apparatus in which a plurality of probes are prepared and replaced in accordance with the surface of the object to be measured, the overall operation which involves the operation of replacing the probes can be designed to be carried out continuously and automatically. Moreover, in the case of the automatic drive type measuring apparatus, the posture changing means, the rotary drive means, the angular position determining means, the probe mounting and dismounting means and so forth which are necessary for the measurement of roundness, cylindricality or the like can be driven under the control of a computer provided in the apparatus.

According to the present invention, it is possible to measure the roundness or the like of the object to be measured as well as the contour, the size and so forth, thereby increasing the number of measurement items. Therefore the applicability and the utilization of the coordinate measuring apparatus can be improved.

What is claimed is:

1. A coordinate measuring apparatus, comprising:
   a mounting table adapted to support thereon an object to be measured;
   a plurality of probe means selectively supported one at a time by a Z-spindle on a body of said apparatus;
   first drive means for spatially moving said probe means and said object relative to each other;
   detection means for detecting the relative movement between a surface on said object and said probe means;
   data processing means for processing the detected data from said detection means and which indicates the magnitude of the relative movement so that dimensions and the like of said object are measured;
   second rotary drive means for selectively turning said Z-spindle in a Z-axis structure supported on said body of said apparatus and yet be capable of axial movement while simultaneously being incapable of turning relative to said body of said apparatus;
   one of said probe means including a main body having an elongated axis, a support member extending in a direction perpendicular to said axis of said main body, a holding member movable along said support member, and a probing tip connected to said holding member;
   means for changing the posture of said probing tip of said probe means by moving said probing tip relative to said main body of said probe means in said direction perpendicular to said axis of said main body of said probe means;
   said detection means including a diametral displacement detector for displacing and outputting a signal representative of a diametral displacement of said probing tip, said diametral displacement occurring in the diametral direction of said object when said rotary drive means is operated while said probing tip is in contact with a round shaft portion of said object, said displacement varying in accordance with the contour of the surface of said round shaft portion; and
   said detection means further including an angle detector connected to said rotary drive means and adapted for detecting the relationship between the rotational positions of said probing tip and said surface of said round shaft portion when said probing tip is displaced by the operation of said rotary drive means.

2. A coordinate measuring apparatus according to claim 1, wherein a driving member is supported on said support member, and wherein said holding member is moved in said direction of extension of said support member when driven by said driving member.

3. A coordinate measuring apparatus according to claim 2, wherein said driving member is constituted by a threaded shaft.

4. A coordinate measuring apparatus according to claim 3, wherein said threaded shaft is disposed so as to pass through said holding member.

5. A coordinate measuring apparatus according to claim 4, wherein a driving power source capable of selectively driving said threaded shaft is connected to one end of said threaded shaft.

6. A coordinate measuring apparatus according to claim 5, wherein said driving power source is constituted by a motor, and wherein an electromagnetic clutch is interposed between the output shaft of said motor and said threaded shaft.

7. A method of effecting coordinate measurement by using a coordinate measuring apparatus having an object mounting table, a moving mechanism movable relative to said object mounting table at least in the directions of two orthogonal axes, a plurality of probes mounted on said moving mechanism and each having a main body and a probing tip disposed on said main body, said probes being selectively replaced relative to the body of said apparatus, thereby enabling various types of measurement in accordance with the shape of an object to be measured supported on said object mounting table, wherein, while said object on said object mounting table is being measured by using a first probe in a predetermined manner, the posture of said probing tip of a second probe to be used in the next measurement process is changed in a diametral direction thereof relative to said main body of said second probe, the diametral displacement of said probing tip being detected and outputted as a signal representative of the magnitude of the displacement, the displacement of said probing tip occurring when a rotary drive means is operated while said probing tip is in contact with a round shaft portion of said object in the diametral direction thereof, and said relative displacement varying in accordance with the contour of the surface of said round shaft portion.

8. A method according to claim 7, wherein said posture of said probing tip of said probe can be changed by a posture changing means which is driven by driving means mounted on a probe stocker disposed on said object mounting table.

9. A method according to claim 7, wherein said probe is of a roundness and cylindricity measuring type.

* * * * *

UNITED STATES PATENT AND TRADEMARK OFFICE
CERTIFICATE OF CORRECTION

PATENT NO. : 4 805 314
DATED : February 21, 1989
INVENTOR(S) : Koji HAYASHI et al.

It is certified that error appears in the above-identified patent and that said Letters Patent is hereby corrected as shown below:

```
Column 11, line 68; change "displacing" to ---detecting---.
Column 12, line 27; change "4" to ---3---.
```

Signed and Sealed this

Fourteenth Day of November, 1989

*Attest:*

JEFFREY M. SAMUELS

*Attesting Officer*     *Acting Commissioner of Patents and Trademarks*